United States Patent [19]
Farris et al.

[11] 3,841,884
[45] Oct. 15, 1974

[54] HIGH ALUMINA REFRACTORY

[75] Inventors: Robert E. Farris, Pleasanton; Maurice E. Green, Jr., Livermore, both of Calif.

[73] Assignee: Kaiser Aluminum & Chemical Corporation, Oakland, Calif.

[22] Filed: Aug. 3, 1973

[21] Appl. No.: 385,428

[52] U.S. Cl. ................................ 106/65, 106/68
[51] Int. Cl. ................... C04b 35/10, C04b 35/14
[58] Field of Search ............................. 106/65, 68

[56] References Cited
UNITED STATES PATENTS

| | | | |
|---|---|---|---|
| 2,878,132 | 3/1959 | Bachman et al. | 106/67 |
| 3,025,175 | 3/1962 | Aldred | 106/67 |
| 3,067,050 | 12/1962 | Miller | 106/65 |
| 3,121,640 | 2/1964 | Miller | 106/68 |

*Primary Examiner*—J. Poer
*Attorney, Agent, or Firm*—Paul E. Calrow; Malcolm McQuarrie

[57] ABSTRACT

A high alumina refractory of improved resistance to deformation at high temperature and resistance to slag penetration is made with a coarse fraction (+28 mesh) containing calcined flint clay and a fine fraction (−65 mesh) of fine silica, such as volatilized silica, and fine alumina. The intermediate fraction 28 × 65 mesh) can be either calcined flint clay or alumina, or a mixture of these two, selected to obtain the properties and $Al_2O_3$ content desired in the composition.

16 Claims, 1 Drawing Figure

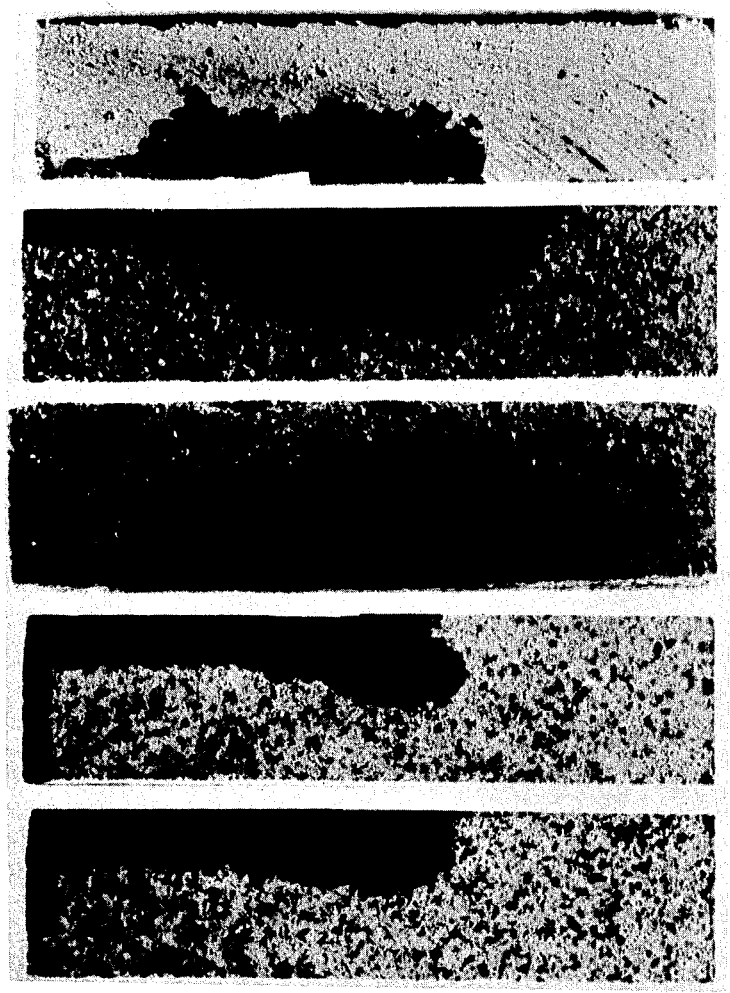

HIGH ALUMINA REFRACTORY

BACKGROUND OF THE INVENTION

This invention concerns refractories, and more particularly high alumina refractories.

High alumina refractories, that is refractories containing over 50% $Al_2O_3$, are well known. The traditional way of making these refractories is to enrich a clay, clays generally containing less than 50% $Al_2O_3$, with a high alumina material such as bauxite, either raw or calcined, or calcined or tabular alumina. In these refractories, at least a portion of the clay is usually plastic clay, the clay acting as the matrix or ground mass holding the coarser refractory grog together. According to the $Al_2O_3$ content desired, some calcined clay or flint clay may be included in the composition.

Other ways of formulating high alumina refractory compositions are known. For example, it is known to make such refractories from coarse calcined china clay and fine alumina, as in U.S. Pat. No. 3,025,175. Likewise, it is known to make such refractories from calcined aluminous material such as diaspore, bauxite, or alumina grog with volatilized silica in the matrix, as described in U.S. Pat. No. 3,067,050. Also, it is known to prereact fireclay and alumina to produce a mullite material, which is then ground and used as a matrix for fireclay grog, as described in U.S. Pat. No. 2,878,132.

One problem with most prior high alumina refractories is that at elevated temperatures they have a relatively high deformation under load, for example under a 25 psi (pounds per square inch) load at 1,600°C. Where improvements have been made over the hot load resistance of conventional high alumina refractories, it has been at the cost of using more expensive processing and/or materials, for example prefiring to form mullite as described above.

The composition of the present invention provides a high alumina refractory of exceptional deformation and slag penetration resistance at high temperatures, made from readily available materials by simple methods.

SUMMARY OF THE INVENTION

It has now been found, according to this invention, that a high alumina refractory of superior resistance to high temperature deformation and slag penetration is made from a refractory composition consisting essentially of from about 35% to 50% by weight of a fine fraction all passing a 65 mesh screen, from about 40% to 55% by weight of a coarse fraction all retained on a 28 mesh screen, and from about 5% to 20% by weight of an intermediate fraction passing a 28 mesh screen and retained on a 65 mesh screen, characterized in that (a) at least 90% of the fine fraction is (i) from 3% to 7% by weight, based on the total weight of the composition, silica passing a 325 mesh screen and (ii) alumina containing at least 95% $Al_2O_3$, at least 40% of the alumina passing a 325 mesh screen, the balance of the fine fraction being calcined flint clay, (b) at least two-thirds of the coarse fraction is sized calcined flint clay, the balance being alumina containing at least 95% $Al_2O_3$, and (c) the intermediate fraction consists essentially of material selected from the group (i) calcined flint clay and (ii) alumina containing at least 95% $Al_2O_3$.

BRIEF DESCRIPTION OF THE DRAWING

The Drawing shows cross sections of various brick which have been subjected to a slag penetration test.

DETAILED DESCRIPTION

To a certain extent, the precise screen sizes chosen to divide a sized refractory composition into coarse, intermediate, and fine fractions are arbitrary. However, the divisions at 28 and 65 mesh used in this specification have been chosen as aptly describing the present invention. From the above summary of the invention, it will be evident to those skilled in the art that, in practicing the invention, one will not use either the maximum or minimum amounts of two of the three fractions since, as will be evident from the ranges given, this would require using an amount of the third fraction outside the limits given.

From the ranges given for each of the three fractions, and from their specified composition, it can be calculated that the overall composition of refractories according to this invention can be expressed as from about 25% to 70% by weight calcined flint clay, from about 25% to 70% by weight alumina, and from 3% to 7% by weight fine silica. However, it will be understood that the specified sizings of these materials are essential to the practice of this invention.

The calcined flint clay used in this invention is a well-known material. Flint clay itself is a naturally occurring refractory clay with a hard dense structure showing conchoidal fracture. It is difficult to slake and has little plasticity under the usual clay working conditions. Calcined flint clay is flint clay which has been heated, for example to a temperature of from 1,400° to 1,500°C, to drive off substantially all the hydroxyl groups found in the natural clay. The resulting product is a hard dense refractory aggregate. Chemically, calcined flint clay contains about 40 to 50% by weight $Al_2O_3$ and about 45 to 55% by weight $SiO_2$, the balance being impurities such as $Fe_2O_3$, $TiO_2$, $Na_2O$, $CaO$, and the like.

The alumina used in the practice of this invention can be any such material, for example tabular alumina or calcined alumina. It will contain at least 95% $Al_2O_3$, and preferably contains at least 99% $Al_2O_3$. The term "alumina" as used in this specification excludes natural materials such as bauxite or calcined bauxite, since these materials contain too much iron and titania impurity to be used in the present invention. In fact, it is believed that natural bauxites not only contain too much iron and titania, but that the distribution of these materials on the surface of the bauxite particles is such that, at high temperatures, they tend to form a liquid flux on the surface of the particles, enabling them to slide readily over one another. It is believed that this feature of natural bauxites leads to the poor creep resistance at high temperatures exhibited by high alumina refractories made with bauxite, as compared to refractories according to the present invention.

Tabular alumina conventionally is made by the so-called "double burn" process wherein an aluminous material, for example aluminum hydroxide produced by the well known Bayer process, is calcined, for example at a temperature about 1,200°C, and the calcined material formed or agglomerated, for example by nodulizing, so that upon a second firing at about 1,800°C, for example, interactions between the aluminous particles cause densification and the formation of alpha alumina crystallites ranging in size from 15 to 1,000 microns. The resulting product is a very hard dense material in coarse grain sizes, for example pieces up to 1 inch in diameter.

Calcined alumina, on the other hand, is made by heating an uncompacted aluminous material such as Bayer aluminum hydroxide so that after calcination and subsequent milling there results alpha alumina in the form of individual crystallites, or fragments thereof, with particle sizes ranging from 1 to 10 microns. Calcination temperatures may range from 1,000° to 1,700°C, depending on crystallite size and surface area desired. For this reason, while fine tabular alumina can be used, it is preferred that the alumina in the fine fraction of this invention be calcined alumina. On the other hand, in the intermediate fraction it is preferred to use a denser, coarser alumina such as tabular.

The finely divided silica may be any such material of the requisite particle size containing at least 90% $SiO_2$. However, the preferred form is the material of commerce known as volatilized silica.

In practicing this invention, the coarse fraction or grog material used must be at least two-thirds, and preferably is all, calcined flint clay. Similarly, the fine fraction or matrix material must be at least 90%, and is preferably entirely, an admixture of alumina and fine silica. On the other hand, the composition of the intermediate fraction is not as critical and either calcined flint clay or alumina, or mixtures of these two may be used.

The exact composition of the intermediate fraction can be chosen, as will be understood by those skilled in the art, to adjust the overall $Al_2O_3$ content of the refractory to any desired level (within limits). For example, a composition containing the minimum amount (35%) of fine matrix material, with the remainder all calcined flint clay, will contain about 60% $Al_2O_3$ overall, assuming the calcined flint clay to be 45% $Al_2O_3$, and the alumina to be over 99% $Al_2O_3$. On the other hand, if the minimum amount (40%) of the coarse fraction is used and it is all calcined flint clay, the remainder of the composition being alumina together with 5% silica, it can be calculated, using the preceding assumptions, that the overall composition will contain slightly less than 75% $Al_2O_3$. Obviously, intermediate $Al_2O_3$ contents can be achieved by selection of the proper amounts of calcined flint clay and alumina.

The coarsest particles, or top sizing, of the composition will depend on the specific application for the composition, and the equipment being used to form it. For example, it has been found that in making bricks from the composition of the present invention best results are obtained when all the material passes a 4 mesh screen.

As will be illustrated by the examples below, it has been found that the best high temperature deformation resistance is obtained when all the calcined flint clay is confined to the coarse (+28) fraction. However, it may be desirable in some applications that refractories according to this invention have a certain small, controlled amount of high temperature deformability built into them. If this is desired, the deformability can be increased by placing some of the calcined flint clay in the intermediate (28 × 65 mesh), or even in the fine (−65 mesh) fractions. Alternatively, or in addition, the amount of fine silica can be decreased to "build in" some high temperature deformation.

Compositions according to the present invention are particularly useful when made into bricks, for example by adding 2 or 3% by weight water, together with 1 or 2% of a temporary binder, and forming in a power press. Generally, such bricks will then be fired, for example at from 1,350° to 1,450°C. It will be understood by those skilled in the art that the specific firing temperature will depend on the composition of the brick. In addition, compositions according to the present invention can be adapted for ramming, casting, gunning, and other methods of forming.

While the refractory compositions according to this invention are comprised of calcined flint clay, alumina, and fine silica, it will be understood that relatively small amounts of other materials, for example temporary binders to aid in pressing or sintering aids such as chromic oxide, can be added, as is well known in the art.

As used in this specification, the term "high temperature deformation resistance" means a deformation of less than 1% in 1.5 hours at a temperature of 1,600°C under a load of 25 psi, per ASTM C-16. By way of comparison, a 70% $Al_2O_3$ refractory which shows a deformation of 2% under these conditions has heretofore been considered good.

Examples

Compositions exemplary of this invention are set forth in Table I. The calcined flint clay used showed the following typical chemical analysis: 45.6% $Al_2O_3$, 50.2% $SiO_2$, 1.2% $Fe_2O_3$, 2.0% $TiO_2$, 0.3% CaO, 0.1% MgO, and 0.6% $Na_2O + K_2O$. The tabular alumina used analyzed over 99.5% $Al_2O_3$, the principal impurity being $Na_2O$. The calcined alumina was a mixture of equal weight parts of two grades of calcined alumina, one with an average particle size of about 8 microns and the other with an average particle size of about 2.5 microns. Each analyzed over 99.5% $Al_2O_3$ and 95% of each passed a 325 mesh screen. The volatilized silica analyzed 95% $SiO_2$, about 3% loss on ignition (mainly carbon), the remainder being impurities such as iron, aluminum, magnesium, and alkali metals (all probably present as oxides).

The calcined flint clay and alumina were mixed with a liquid lignosulfonate binder at the rate of 4 gallons of binder to 2,000 pounds of refractories, together with an additional 2.6%

Table I

| Composition No. | 1 | 2 | 3 | 4 | 5 | 6 |
|---|---|---|---|---|---|---|
| Calcined Flint Clay, | | | | | | |
| +28 | 45 | 39 | 45 | 47 | 36 | 48 |
| −28 | 0 | 6 | 0 | 0 | 0 | 7 |
| Tabular Alumina, | | | | | | |
| +28 | 0 | 0 | 7 | 7 | 10 | 3.5 |
| 28×65 | 13.5 | 13.5 | 7.6 | 7.6 | 11 | 3.8 |
| −65 | 16.5 | 16.5 | 5.4 | 5.4 | 8 | 2.7 |

Table I — Continued

|  | | | | | | |
|---|---|---|---|---|---|---|
| −325 | 0 | 0 | 30 | 30 | 30 | 30 |
| Calcined Alumina | 20 | 20 | 0 | 0 | 0 | 0 |
| Volatilized Silica | 5 | 5 | 5 | 3 | 5 | 5 |
| Properties | | | | | | |
| Fired Bulk Density (pcf) | 167 | 163 | 167 | 164 | 170 | 161 |
| Apparent Porosity (%) | 14.6 | 16.2 | 14.7 | 16.7 | 16.0 | 15.0 |
| 1600°C Deformation (%) | +0.16 | −0.89 | 0 | −1.33 | +0.18* | −0.5* |
| RT MOR (psi) | — | — | 2074 | 1712 | 2093 | 2250 |
| 1482°C MOR (psi) | — | — | 994 | 643 | 1246 | 866 |
| 1600°C reheat change (%) | — | — | +1.7 | +2.1 | +1.4 | +2.0 |

*at 1650°C.

by weight (dry basis) water. After the flint clay, alumina, and liquids were thoroughly mixed, the volatilized silica was added. The mixtures were pressed into refractory brick at 10,000 psi. After drying, the brick were fired to cone 13–14 (1,350° to 1,400°C).

After firing, the brick were measured to determine bulk density (by ASTM Test C-20), in pounds per cubic feet (pcf), apparent porosity (by ASTM C-20), in volume per cent, modulus of rupture at room temperature (RT) and 1,482°C (ASTM C-133 and C-583), linear change upon reheating to 1,600°C (ASTM C-113), and subsidence under a load of 25 psi for 1.5 hours at 1,600° (or 1,650)°C.

Composition 1 is an example of the preferred embodiment wherein all the flint clay is +28 mesh. Composition 2 may be compared with Composition 1 to show the effect of −28 mesh flint clay, particularly on the high temperature deformation, which changes from a slight expansion to a subsidence of nearly 1% when −28 mesh flint is included. Compositions 1 and 2 both illustrate the use of calcined alumina in the fine fraction.

Composition 3 illustrates the use of tabular alumina as the sole source of alumina, 30% of the composition being −325 mesh tabular alumina. Composition 4 can be compared with Composition 3 to show the effect of decreased silica content, particularly on the deformation of 1,600°C, which increases from zero to over 1% subsidence as the volatilized silica is decreased.

Compositions 5 and 6 illustrate compositions with different total $Al_2O_3$ contents, Composition 5 being nominally 75% $Al_2O_3$, and Composition 6 being nominally 65% $Al_2O_3$. Compositions 1 to 4 are all nominally 70% $Al_2O_3$.

By way of comparison, conventional 70% alumina brick made from clay and calcined bauxite show deformations of from 8 to 13% under a 25 psi load at about 1,600°C. Similarly, the porosities of from about 14 to 17 volume % shown in Table I can be compared to porosities of from 18 to 22 volume % for conventional 70% alumina brick. Likewise, the room temperature modulus of rupture of from 1,700 to 2,200 psi shown in Table I compare with values of 1,000 to 1,400 psi for conventional 70% alumina brick. Finally, the expansions of about 2% or less upon reheating to 1,600°C shown in Table I may be compared with values of from 3 to 6% expansion for a conventional 70% alumina brick.

Brick made from Compositions 1 and 2 were subjected to a slag penetration test by drilling a ⅞ inch diameter hole 4.5 inches deep in the 2½ × 4½ inches face of the brick. 75 grams of technical grade $Fe_2O_3$ were tapped into the hole and the brick heated according to the following schedule: from room temperature to 1,430°C in 4 hours, 1,430°C to 1,610°C at 83°C per hour, followed by a 3 hour soak at 1,610°C. The oxygen content of the furnace was maintained at greater than 0.5%. For comparison purposes, two conventional 70% alumina brick, A and B, were subjected to the same slag erosion test. These brick were made from bauxite, calcined flint, and clay.

The results of the slag erosion tests, after cutting the specimens vertically through the center of the cavity, are shown in the FIGURE, the designation of each specimen corresponding to the composition designations heretofore used. The extensive erosion of the conventional high alumina Compositions A and B is readily apparent, as is the lesser penetration of compositions according to this invention. A noteworthy feature of the erosion test on brick made according to this invention is the tendency of the iron oxide to flow up the cavity walls and over the outer surface of the brick. While the iron oxide has completely penetrated the conventional brick, there is residual charge at the bottom of the hole in the brick made according to this invention.

Also shown for comparison in the FIGURE is a 90% alumina brick, made entirely with tabular alumina and volatilized silica (Composition C). Although the penetration of the iron oxide into the 90% alumina brick is comparable to its penetration into the 70% alumina brick of this invention, it can be seen that many particles of coarse alumina have floated up into the molten iron oxide, indicating severe attack on the brick. Apparently the use of coarse calcined flint clay, together with a matrix of alumina and silica, gives the brick of this invention special resistance to molten iron oxide.

In the specification and claims, percentages and parts are by weight unless otherwise indicated, except that porosities are expressed in volume per cent. Mesh sizes referred to herein are Tyler standard screen sizes which are defined in Chemical Engineers' Handbook, John H. Perry, Editor-in-Chief, Third Edition, 1950, published by McGraw Hill Book Company, at page 963. For example, a 65 mesh screen opening corresponds to 0.208 millimeter, and 28 mesh to 0.589 millimeter. Analyses of mineral components are reported in the usual manner, expressed as simple oxides, e.g., $Al_2O_3$, $SiO_2$, although the components may actually be present in various combinations, e.g., as an aluminum silicate. Cone numbers used refer to the Standard Pyrometic Cones (manufactured by Edward Orton, Jr., Ceramic Foundation) used to measure the combined effect of time and temperature in the firing of ceramic products. Thus, for example, "cone 15" represents a heating to 2,595°F (1,425°C) at a rate of 108°F (60°C) per hour which is equivalent to a heating to 2,608°F (1,430°C) at a rate of 270°C (150°C) per hour.

What is claimed is:

1. A refractory composition consisting essentially of from about 35% to 50% by weight of a fine fraction all passing a 65 mesh screen, from about 40% to 55% by weight of a coarse fraction all retained on a 28 mesh screen, and from about 5% to 20% by weight of an intermediate fraction passing a 28 mesh screen and retained on a 65 mesh screen, characterized in that (a) at least 90% of the fine fraction is (i) from 3% to 7% by weight, based on the total weight of the composition, silica passing a 325 mesh screen and (ii) alumina containing at least 95% $Al_2O_3$, at least 40% of the alumina passing a 325 mesh screen, the balance of the fine fraction being calcined flint clay, (b) at least two-thirds of the coarse fraction is sized calcined flint clay, the balance being alumina containing at least 95% $Al_2O_3$, and (c) the intermediate fraction consists essentially of material selected from the group (i) calcined flint clay and (ii) alumina containing at least 95% $Al_2O_3$.

2. Composition according to claim 1 characterized in that the alumina contains at least 99% $Al_2O_3$.

3. Composition according to claim 1 characterized in that the silica is volatilized silica.

4. Composition according to claim 3 characterized in that the alumina contains at least 99% $Al_2O_3$.

5. Composition according to claim 1 characterized in that at least some of the alumina in the fine fraction is calcined alumina containing at least 99% $Al_2O_3$ and any alumina in the intermediate and coarse fractions is tabular alumina containing at least 99% $Al_2O_3$.

6. Composition according to claim 5 characterized in that the silica is volatilized silica.

7. Composition according to claim 1 characterized in that all the calcined flint clay is in the coarse fraction.

8. Composition according to claim 7 characterized in that the fine fraction contains 5% volatilized silica.

9. Composition according to claim 7 characterized in that the intermediate fraction is entirely tabular alumina.

10. Composition according to claim 9 characterized in that the fine fraction contains 5% volatilized silica.

11. Composition according to claim 10 characterized in that it has been fired to a temperature of from 1,350° to 1,450°C.

12. Composition according to claim 1 wherein all the coarse fraction is calcined flint clay and all the fine fraction is silica and alumina.

13. Composition according to claim 12 wherein the alumina in the fine fraction is calcined alumina and any alumina in the intermediate fraction is tabular alumina.

14. Composition according to claim 13 wherein the alumina contains at least 99% $Al_2O_3$.

15. Composition according to claim 14 wherein the intermediate fraction is all tabular alumina.

16. Composition according to claim 15 consisting essentially of about 45% calcined flint clay retained on a 28 mesh screen, about 15% tabular alumina passing a 28 mesh screen and retained on a 65 mesh screen, about 5% volatilized silica, about 15% tabular alumina passing a 65 mesh screen, and about 20% calcined alumina at least 95% of which passes a 325 mesh screen.

* * * * *